(12) United States Patent
Okuhara et al.

(10) Patent No.: US 8,375,513 B2
(45) Date of Patent: Feb. 19, 2013

(54) GROMMET

(75) Inventors: Takashi Okuhara, Yokkaichi (JP);
Tsutomu Sakata, Yokkaichi (JP);
Satoshi Ujita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 288 days.

(21) Appl. No.: 12/992,738

(22) PCT Filed: Dec. 17, 2008

(86) PCT No.: PCT/JP2008/072984
§ 371 (c)(1),
(2), (4) Date: Nov. 15, 2010

(87) PCT Pub. No.: WO2009/147760
PCT Pub. Date: Dec. 10, 2009

(65) Prior Publication Data
US 2011/0067201 A1  Mar. 24, 2011

(30) Foreign Application Priority Data
Jun. 3, 2008  (JP) .................. 2008-146301

(51) Int. Cl.
*F16L 5/00* (2006.01)
*H02G 3/22* (2006.01)
(52) U.S. Cl. .................. 16/2.1; 174/152 G; 174/153 G
(58) Field of Classification Search ............ 16/2.1, 16/2.2, 2.5; 174/152 R, 152 G, 153 G, 154, 174/167, 650, 659, 660, 668; 277/602, 606, 277/608; 248/56, 68.1, 74.1, 74.2, 74.3, 248/231.9
See application file for complete search history.

(56) References Cited

U.S. PATENT DOCUMENTS
6,708,366 B2 * 3/2004 Ono et al. .................. 16/2.5
RE38,788 E * 9/2005 Satou et al. .................. 16/2.1
(Continued)

FOREIGN PATENT DOCUMENTS
JP   10012072 A * 1/1998
JP   2001-333521   11/2001
(Continued)

OTHER PUBLICATIONS
U.S. Appl. No. 12/898,113 to Tetsuya Fujita, filed Oct. 5, 2010.
(Continued)

*Primary Examiner* — Chuck Y. Mah
(74) *Attorney, Agent, or Firm* — Greenblum & Bernstein P.L.C.

(57) ABSTRACT

A grommet includes an inner tube, an outer tube coupled through an annular coupling section to the inner tube and provided with a slant wall section. The outer tube is provided on a larger diameter end of the slant wall section with a larger thickness portion and an annular latch recess between the larger diameter end of the slant wall section and the larger thickness portion. The slant wall section has a plurality of stepped projecting ribs that extend radially from a smaller diameter end of the slant wall section to the larger diameter end. Each of the projecting ribs is provided on a stepped top surface with a first slant surface that is inclined down to the side surface end of the latch recess, and is provided on both side surfaces with a second slant surface and a third slant surface that are inclined down from the top surface across the first slant surface. The first, second, and third slant surfaces form a three- side-cut-away portion.

16 Claims, 8 Drawing Sheets

U.S. PATENT DOCUMENTS

| | | | |
|---|---|---|---|
| 6,941,714 B2 * | 9/2005 | Nakamura | 52/395 |
| 7,105,750 B1 * | 9/2006 | Duhr | 174/650 |
| 2001/0045298 A1 | 11/2001 | Nakata | |
| 2002/0036097 A1 | 3/2002 | Okuhara et al. | |
| 2002/0036098 A1 | 3/2002 | Okuhara et al. | |
| 2004/0154819 A1 * | 8/2004 | Sakata | 174/65 G |
| 2004/0206538 A1 * | 10/2004 | Okuhara | 174/65 G |
| 2005/0062694 A1 * | 3/2005 | Nakamura et al. | 345/80 |
| 2006/0086524 A1 * | 4/2006 | Suzuki | 174/65 G |
| 2008/0017401 A1 * | 1/2008 | Uchida et al. | 174/153 G |
| 2010/0181097 A1 * | 7/2010 | Nagayasu | 174/152 G |

FOREIGN PATENT DOCUMENTS

| | | |
|---|---|---|
| JP | 2002-171644 | 6/2002 |
| JP | 2002-171647 | 6/2002 |
| JP | 2003-134646 | 5/2003 |
| JP | 2005-190973 | 7/2005 |
| JP | 2007-276558 | 10/2007 |

OTHER PUBLICATIONS

U.S. Appl. No. 12/992,926 to Takashi Okuhara et al., filed Nov. 16, 2010.

U.S. Appl. No. 12/994,042 to Takashi Okuhara et al., filed Nov. 22, 2010.

U.S. Appl. No. 12/994,060 to Takashi Okuhara et al., filed Nov. 22, 2010.

U.S. Appl. No. 12/995,876 to Takashi Okuhara et al., filed Dec. 2, 2010.

* cited by examiner

GROMMET

FIELD OF THE INVENTION

This invention relates to a grommet and more particularly relates to a grommet that is mounted on a wire harness to be wired in a motor vehicle and is attached to a through-hole in a vehicle body panel to protect, waterproof, and dustproof a portion of the wire harness inserted in the through-hole.

BACKGROUND OF THE INVENTION

Heretofore, a wire harness to be wired from an engine room in a motor vehicle to a passenger room mounts a grommet, and the grommet is attached to a through-hole provided in a vehicle body panel for partitioning a vehicle body of the motor vehicle into the engine room and the passenger room so as to protect the wire harness passing the through-hole and to waterproof, dustproof, and sound-insulate from an engine room side to a passenger room side.

The present applicant has proposed a so-called one-motion type grommet in which a vehicle body latch recess provided on an outer peripheral surface is engaged with an peripheral edge around the through-hole merely by pushing the grommet into the through-hole in the vehicle body panel from a one side.

As shown in FIG. 9A, a one-motion type grommet 100 disclosed in JP 2002-171647 A (Patent Document 1) is mounted on a wire harness W/H, the grommet 100 is attached to a through-hole 3 in a vehicle body panel 2 that partitions a vehicle body into an engine room X and a passenger room Y merely by pushing the wire harness into the through-hole 3 at the engine room X, and the wire harness W/H is drawn out from the engine room X to the passenger room Y. That is, a side of the engine room X across the panel 2 defines a pushing-in side P1 for the wire harness W/H while a side of the passenger room Y across the panel 2 defines a drawing-out side P2 for the wire harness W/H.

The grommet 100 includes a smaller diameter tubular section 103 through which the wire harness W/H passes in a close contact manner, and an enlarging diameter tubular section 104 provided on a pushing-in side end of the section 103. A smaller diameter end 104a of the enlarging diameter section 104 is contiguous with the pushing-in side end of the smaller diameter tubular section 103. A vehicle body latch recess 101 is provided in an outer peripheral surface of an enlarging diameter end 104b of the section 104.

When the grommet 100 is inserted into and attached to the through-hole 3 in the vehicle body panel 2, the smaller diameter tubular section 103 is inserted into the through-hole 3, the wire harness W/H is pushed into the drawing-out side P2 from the pushing-in side P1. Then, the enlarging diameter tubular section 104 is deflected inward and a peripheral edge around the through-hole 3 falls down in the vehicle body latch recess 101. Consequently, the grommet 100 is engaged with the vehicle body panel 2.

At this time, the enlarging diameter tubular section 104 is provided on its outer slant peripheral surface with stepped projecting ribs 105 in a peripheral direction, thereby reducing a contact area between the grommet 100 and the inner peripheral surface of the through-hole 3 to lower an inserting resistance. As shown in FIG. 9B, projecting amounts of the projecting ribs 105 are decreased in a direction to a distal end of a side surface 101a of a vehicle body latch recess 101 so that the projecting amounts of the projecting ribs become zero at the distal end of the side surface 101a.

As described above, if the projecting amounts of the projecting ribs are gradually decreased toward the vehicle body latch recess 101, it is possible to lower an inserting force.

However, when the grommet is inserted into the through-hole, it is difficult to accord a central axis of the grommet with an axis of the through-hole 3 so that the grommet is inserted into the through-hole straightly. Consequently, the grommet is inserted into the through-hole in a slightly slant position. In this case, the vehicle body latch recess is inclined with respect to the through-hole, and there is a problem that edges of side surfaces of the projecting ribs are likely to be caught by a peripheral edge around the through-hole. In particular, in the case of a burred hole in which a burr protrudes from the peripheral edge around the through-hole, a distal end of the burr is likely to catch the side surfaces of the projecting ribs. Consequently, there are problems that the through-hole hardly falls down into the vehicle body latch recess smoothly and the projecting ribs are likely to be broken.

Patent Document 1: JP 2002-171647 A

SUMMARY OF THE INVENTION

Problems that the Invention is to Solve

In view of the above problems, an object of the present invention is to provide a grommet that can reduce an inserting force to a through-hole in a vehicle body panel by providing the grommet on its outer slant peripheral surface with projecting ribs and that can engage the through-hole smoothly without causing the projecting ribs to be caught by the peripheral edge around the through-hole.

Means for Solving the Problems

In order to achieve the above object, the present invention is directed to a grommet that is mounted on a wire harness to be inserted into a through-hole in a vehicle body, is engaged with a vehicle body, and is made of an elastic material. The grommet includes: an inner tube for passing electrical cables in the wire harness in a close contact manner; and an outer tube coupled through an annular coupling section to an outer peripheral surface of the inner tube and provided with a slant wall section. The outer tube is provided on a larger diameter end of the slant wall section with a larger thickness portion in parallel to an axial direction. An annular vehicle body latch recess is provided in an outer peripheral surface at a boundary area between the larger diameter end of the slant wall section and the larger thickness portion. The slant wall section is provided on an outer peripheral surface with a plurality of stepped projecting ribs that extend radially from a smaller diameter end of the slant wall section to the larger diameter end and are separated apart from one another in a peripheral direction. A distal end of each of the projecting ribs is disposed at a side surface end of the vehicle body latch recess. Each of the projecting ribs is provided on a stepped top surface with a first slant surface that is inclined down to the side surface end of the vehicle body latch recess, and is provided on both side surfaces with a second slant surface and a third slant surface that are inclined down from the top surface across the first slant surface. The first, second, and third slant surfaces form a three-side-cut-away portion.

As described above, each projecting rib is provided on its distal end with not only the first slant surface that is formed by cutting away the top surface of the rib but also the second and third slant surfaces that are formed by cutting away both side surfaces of the rib. Thus, the distal end of each projecting rib adjacent to the vehicle body latch recess is provided on the three-side-cutting-away portion. According to the three-side-cutting-away portion, even if the vehicle body latch recess is inclined with respect to the through-hole and the projecting ribs are caught by the inner surface of the through-hole or the burr that protrudes from the inner peripheral surface of the through-hole, the inner surface slides onto the slant surfaces of three-side-cutting-away portion and are guided into the vehicle body latch recess, so that the inner peripheral edge around the through-hole and the burr can fall down into the vehicle body latch recess smoothly.

The slant wall section and the projecting ribs of the outer tube are provided with curved portions at an outer diametrical position having an outer diameter corresponding to an inner diameter of the through-hole in the vehicle body panel. The curved portions have different inclination angles on the slant wall section. Inclination angles of an outer peripheral surface of the slant wall section at a larger diameter side with respect to the curved portions are set to be smaller than inclination angles at a smaller diameter side with respect to the curved portions. The first, second, and third slant surfaces are provided on the larger diameter side from the curved portions to the vehicle body latch recess. Ridges intersecting among the first, second, and third slant surfaces and ridges between the top surface and the second and third slant surfaces are rounded.

Thus, since each projecting rib is formed into the three-side-cutting-away portion at the position where the rib contacts with the inner peripheral edge around the through-hole, it is possible to lower the inserting force of the grommet and to eliminate interference of the rib with the inner peripheral edge around the through-hole. This can permit the vehicle body latch recess to be smoothly engaged with the inner peripheral edge around the through-hole.

Preferably, inclination angles of the first, second, and third slant surfaces with respect to the top surface are set to be 30 to 60 (thirty to sixty) degrees.

The number of the projecting ribs is set to be 4 to 8 (four to eight).

Each projecting rib has a stepped projection with a desired width in the peripheral direction. When the top surface of the stepped projection contacts with the inner peripheral surface of the through-hole, the grommet can enter the through-hole in a stable position. At this time, the smaller contact area becomes, the smaller inserting force is exerted. However, if the contact area of the projecting rib is small, a part, on which the projecting ribs are not provided, will contact with the inner peripheral surface of the through-hole. The optimum number and contact area of the projecting ribs are determined in accordance with the above mutual conditions. In view of these conditions, the number of the projecting ribs is 4 to 8 (four to eight) preferably. Most preferably, the number will be 6 (six).

Preferably, the annular coupling section protrudes from an outer peripheral surface of the inner tube at an intermediate part between both ends of the inner tube at a pushing-in side and a drawing-out side in a longitudinal direction. The larger thickness portion of the outer tube is contiguous with an outer peripheral end of the annular coupling section. An inner peripheral surface at the smaller diameter end of the slant wall section is spaced apart through a given clearance from the outer peripheral surface of the inner tube. An end of the inner tube at the drawing-out side protrudes outward from the slant wall section.

The slant wall section may be provided on the smaller diameter end with a drawing-out distal end side tubular section that extend in parallel to the axial direction of the inner tube. The separated clearance may be defined between an inner peripheral surface of the drawing-out distal end side tubular section and the outer peripheral surface of the inner tube.

In the above grommet, the inner tube of the grommet through which the wire harness passes in a close contact manner is separated through the great clearance from the outer tube in which the vehicle body latch recess is provided.

In this separated type grommet, even if the wire harness that is drawn out from the grommet and is arranged in the passenger room is bent sharply by an angle of about 90 degrees and the inner tube is deformed to follow the bending of the wire harness, it is possible not to directly transmit the deformation of the inner tube to the outer tube. Also, since the inner tube is coupled to the outer tube through the annular coupling section provided on the intermediate part of the inner tube apart from the drawing-out side in the longitudinal direction, the annular coupling section also can absorb the deformation of the inner tube and the deformation effect is not applied to the vehicle body latch recess provided in the larger diameter end side of the outer tube.

Preferably, the annular coupling section protrudes slant from a coupling part with the inner tube toward the pushing-in side. A pushing rib protrudes from a slant portion of the annular coupling section toward an inner surface of the slant wall section of the outer tube. A bending stress absorbing portion is disposed at a side of the curved portion over a position on the slant wall section with which the pushing rib contacts.

When the grommet is inserted into the through-hole in the vehicle body panel, a working person holds and pushes the wire harness at the pushing-in side of the inner tube. Since the inner tube is coupled through the annular coupling section to the outer tube, the pushing force is hardly transmitted to the slant wall section at the drawing-out side of the outer tube. Thus, the pushing rib protrudes from the annular coupling section, and the pushing rib contacts with the inner peripheral surface of the slant wall section at the drawing-out side to transmit the pushing force to the slant wall section, thereby enhancing workability of inserting the grommet.

Since the annular coupling section has a smaller thickness and does not protrude directly in the radial direction but slants in the axial direction, when the inner tube is deformed on account of the bending of the wire harness, the annular coupling section can absorb the deformation, so that the deformation does not affect the outer tube. Thus, even if the wire harness is sharply bent at the pushing-in side in the engine room side, the annular coupling section can absorb the deformation of the wire harness, so that the vehicle body latch recess provided in the outer tube is not deformed.

Preferably, the annular coupling section is formed into a V-shaped configuration in which the one part is inclined from the inner tube toward the pushing-in side and the other part is inclined from a crest toward the drawing-out side. This V-shaped configuration can increase an amount of absorbing the deformation of the wire harness in the annular coupling section.

If the pushing rib is continuous on the whole periphery of the annular coupling section, the pushing rib can uniformly transmit the pushing-in force to the slant wall section. However, in the case where a cable or a hose must pass the grommet, the pushing rib is separated at the passing part of the cable or the hose.

Preferably, a thickness of the pushing rib is set to be 2 to 4 (two to four) times of a thickness of the annular coupling section and is set to be larger than a thickness of the slant wall section.

The grommet of the present invention is not limited to the separated type grommet. The present invention can be applied to a grommet shown in FIGS. 9A and 9B wherein the smaller diameter end of the slant wall section is coupled through the annular coupling section to said inner tube.

Effects of the Invention

As described above, according to the grommet of the present invention, since each of the stepped projecting ribs provided on the slant wall section of the outer tube is provided on the distal end adjacent to the vehicle body latch recess with the three-side-cut-away portion, it is possible to prevent the projecting rib from being caught by the inner peripheral surface of the through-hole and to cause the inner peripheral edge around the through-hole to fall down into the vehicle body latch recess smoothly, thereby enhancing a feeling in insertion.

EXPLANATION OF SIGNS

Figure 1A:
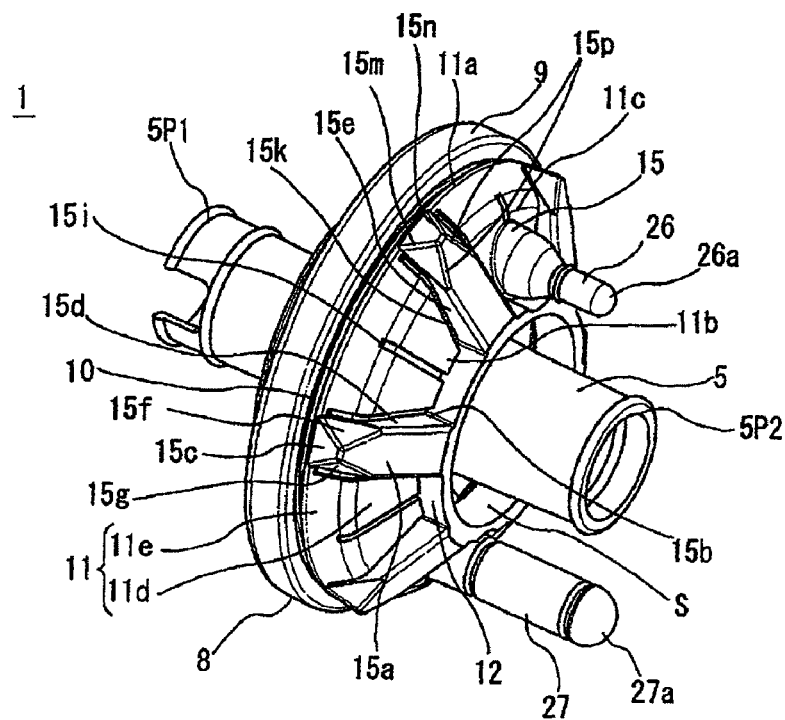
FIG. 1A is a perspective view of a first embodiment of a grommet in accordance with the present invention taken from a drawing-out side.
Figure 1B:
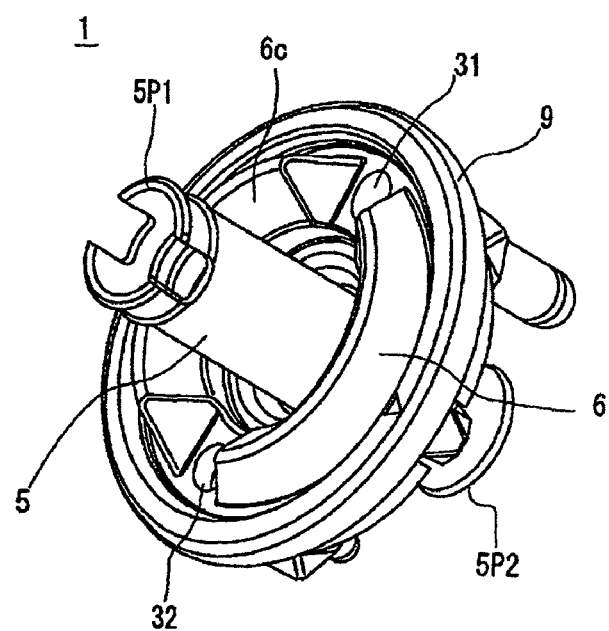
FIG. 1B is a perspective view of the grommet of the present invention taken from a pushing-in side.

1: grommet
2: vehicle body panel
3: through-hole
5: inner tube
6: annular coupling section
8: outer tube
9: larger thickness portion
10: vehicle body latch recess
11: slant wall section
   11h: parallel surface portion
15: projecting ribs
   15a: top surface
   15c: first slant surface
   15f: second slant surface
   15g: third slant surface
18: pushing rib Preferred Aspects of Embodying the Invention Referring now to the drawings, embodiments of a grommet in accordance with the present invention will be described below.

FIG. 1A to FIG. 7B show a first embodiment of a grommet in accordance with the present invention.

Figure 6:
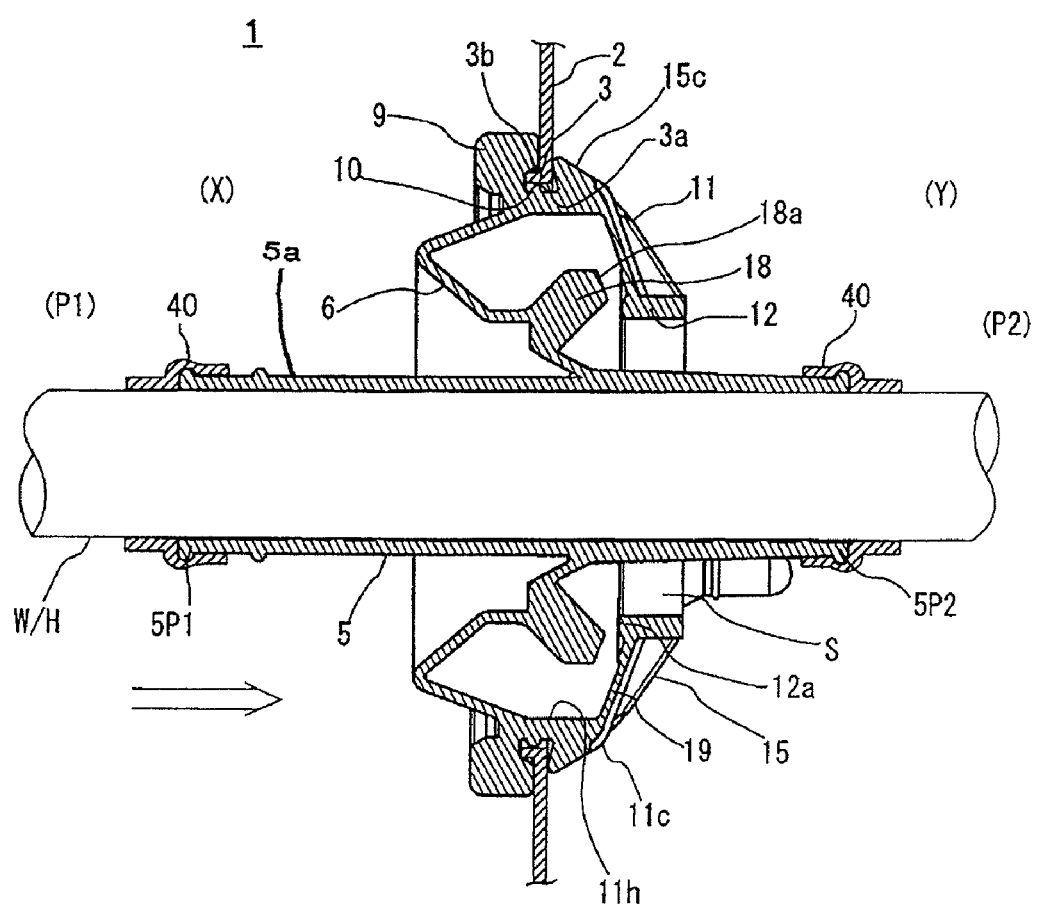
FIG. 6 is a longitudinal section view of the grommet similar to FIG. 4, illustrating the grommet into which a wire harness is inserted and that is attached to a vehicle body.

As shown in FIG. 6, a grommet 1 is mounted on a wire harness W/H arranged from an engine room X in a motor vehicle via a through-hole 3 in a vehicle body panel 2 to a passenger room Y. The grommet 1 is engaged with a peripheral edge around the through-hole 3 to be attached to the vehicle body. The grommet 1 is a one-motion type grommet that is inserted into the through-hole 3 from an engine room X so as to be attached to the vehicle body. The one end of the grommet 1 defines a pushing-in side P1 while the other end defines a drawing-out side P2. The grommet 1 is molded from rubber or elastomer.

The grommet 1 in the first embodiment is a separated type grommet in which a clearance is defined between a smaller diameter end of a slant wall section and an inner tube.

The grommet 1 includes an inner tube 5 having a smaller diameter and permitting a set of electrical cables in the wire harness W/H to pass in a close contact manner, an annular coupling section 6 that protrudes from an outer peripheral surface 5a on an intermediate part of the inner tube 5 between a pushing-in end 5P1 at the pushing-in side P1 and a drawing-out end 5P2 at the drawing-out side P2 in a longitudinal direction of the inner tube 5, and an outer tube 8 having a larger diameter and contiguous with an outer peripheral surface of the annular coupling section 6.

The outer tube 8 is coaxial with the inner tube 5 and is disposed through a space on an intermediate part of the inner tube 5 in its longitudinal direction. The inner tube 5 protrudes from opposite ends of the outer tube 8 at the pushing-in side P1 and the drawing-out side P2 in the longitudinal direction.

The outer tube 8 extends to the drawing-out side P2 from a connecting part between the outer tube 8 and an outer peripheral surface of the annular coupling section 6. A slant wall section 11 is contiguous with a larger thickness portion 9 provided on the connecting part and extends to the drawing-out side P2 to reduce a diameter of the section 11 in the axial direction. An annular vehicle body latch recess 10 is provided in an outer peripheral surface on a boundary area between the larger thickness portion 9 and a larger diameter end of the slant wall section 11. The slant wall section 11 is provided on its smaller diameter end with a drawing-out distal end side tubular portion 12 that extends in parallel to the axial direction of the inner tube 5.

An annular clearance S (FIG. 4) is defined between an inner peripheral surface of the drawing-out distal end side tubular portion 12 and the outer peripheral surface 5a of the inner tube 5 to separate the portion 12 apart from the inner tube 5. That is, a smaller diameter end of the outer tube 8 surrounds the outer peripheral surface 5a of the inner tube 5 through the annular clearance S and the drawing-out side end 5P2 protrudes outward from the outer tube 8.

Figure 4:
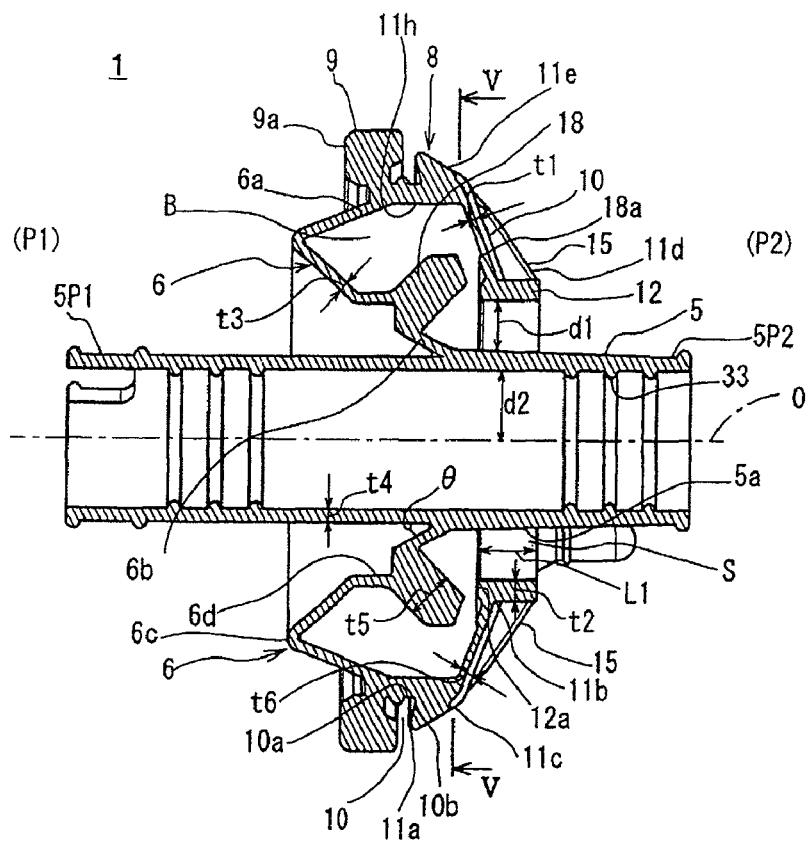
FIG. 4 is a longitudinal section view of the grommet taken along lines IV-IV in FIG. 2.

As shown in FIG. 4, a radial distance d1 of the annular clearance S is set to be ½ to 3/2 (one-half to three-halves) of a radius d2 of the inner tube 5. It is preferable in the present embodiment that the radial distance d1 is ¾ (three quarters) of the radius d2. A length L1 of the drawing-out distal end side tubular portion 12 that extends through the annular clearance S in parallel to the outer peripheral surface 5a of the inner tube 5 may be altered in accordance with a size of the grommet 1. It is preferable in the present embodiment that the length L1 is 5 to 15 mm (five to fifteen millimeters).

As shown in FIG. 4, the larger thickness portion 9 of the outer tube 8 protrudes slightly toward the pushing-in side P1 from the connecting part between the larger thickness portion 9 and an outer peripheral end 6a of the annular coupling section 6. A pushing-in side distal end surface 9a defines an orthogonal surface to an axis O. An annular vehicle body latch recess 10 is provided between the larger diameter portion 9 and a larger diameter end 11a of the slant wall section 11. A distal end of a drawing-out side surface 10b that stands up from a bottom surface 10a of the vehicle body latch recess 10 is contiguous with the larger diameter end 11a of the slant wall section 11. A curved portion 11c is provided between the larger diameter end 11a and a smaller diameter end 11b so as to change an inclination angle of the outer peripheral surface of the slant wall section 11. An inclination angle at the smaller diameter end side with respect to the curved portion 11c is set to be large while an inclination angle at the larger diameter end side with respect to the curved portion 11c is set to be small.

The slant wall section 11 is provided on the outer peripheral surface that changes the inclination angle with six axially stepped projecting ribs 15 that extend from the larger diameter end 11a of the distal end of the drawing-out side surface 10b on the vehicle body latch recess 10 to the smaller diameter end 11b and are spaced apart from one another in the peripheral direction. Since these six projecting ribs 15 have the same widths in the peripheral direction, the projecting ribs 15 that extend radially from the smaller diameter end to the larger diameter end have narrow distances between the adjacent ribs 15 at the smaller diameter end side in the peripheral direction and wide distances between the adjacent ribs 15 at the larger diameter end side.

An imaginary circle created by continuing the stepped projecting ribs 15 in the peripheral direction of the curved portion 11c is set to be equal to an inner diameter of the through-hole 3 in the vehicle body panel 2.

Figure 2:
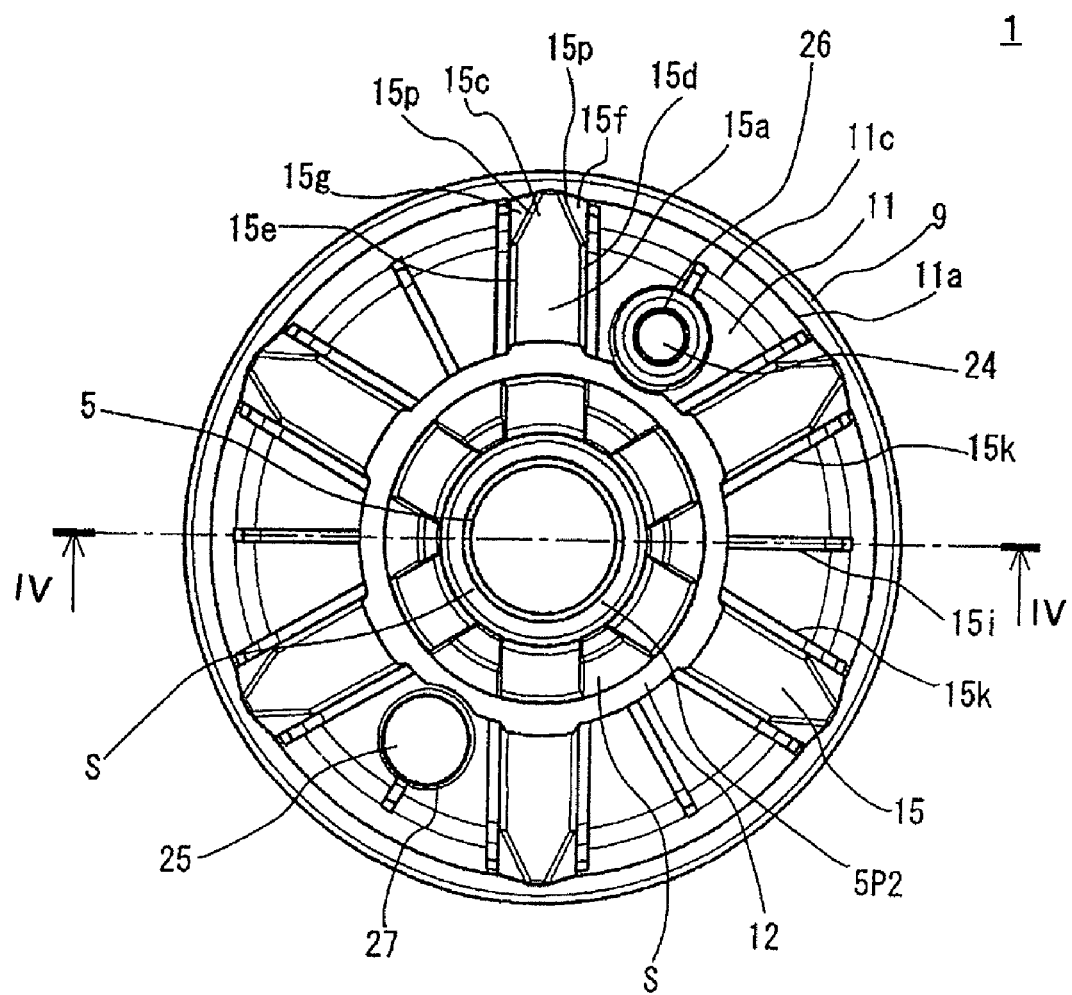
FIG. 2 is a plan view of the grommet shown in FIG. 1, illustrating the grommet taken from the drawing-out side.
Figure 3:
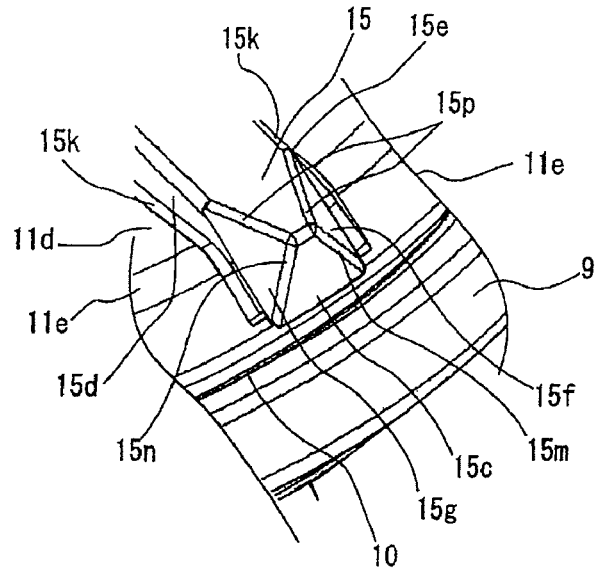
FIG. 3 is an enlarged view of a main part of the grommet shown in FIG. 1A.

As shown in FIG. 1A, FIG. 2, and FIG. 3, each projecting rib 15 is provided on its larger diameter end 11e from the drawing-out side surface 10b of the vehicle body latch recess 10 to the curved portion 11c with a three-side-cut-away portion.

That is, the three-side-cut-away portion includes a first slant surface 15c that inclines from a top surface 15a of each projecting rib 15 toward the distal end of the drawing-out side surface 10b of the vehicle body latch recess 10, and second and third slant surfaces 15f an 15g that incline downward from the side surfaces 15d and 15e across the first slant surface 15c.

A ridge 15m defines an intersecting line between the first slant surface 15c and the second slant surface 15f, a ridge 15n defines an intersecting line between the first slant surface 15c and the third slant surface 15g, and ridges 15p define intersecting lines between the top surface 15a and the second and third slant surfaces 15f and 15g. The ridges 15m, 15n, and 15p are rounded.

The first slant surface 15c, second slant surface 15f and third slant surface 15g are inclined at an angle of 30 to 60 (thirty to sixty) degrees with respect to the top surface 15a. In the present embodiment, the inclination angle is set to be 48 (forty-eight) degrees.

As shown in FIG. 1A and FIG. 2, the slant wall section 11 is provided with longitudinal grooves 15k and 15i in the outer peripheral surface that is provided no projecting rib 15 at proximal ends of the rib 15 and at a central part between the adjacent ribs 15 to facilitate deflection of the slant wall 11.

The inner peripheral surface of the outer tube 8 from the larger thickness portion 9 to the curved portion 11c of the slant wall section 11, that is, from the larger thickness portion 9 to a larger diameter side end 11e defines a parallel surface 11h in parallel to the axial direction O.

Figure 5:
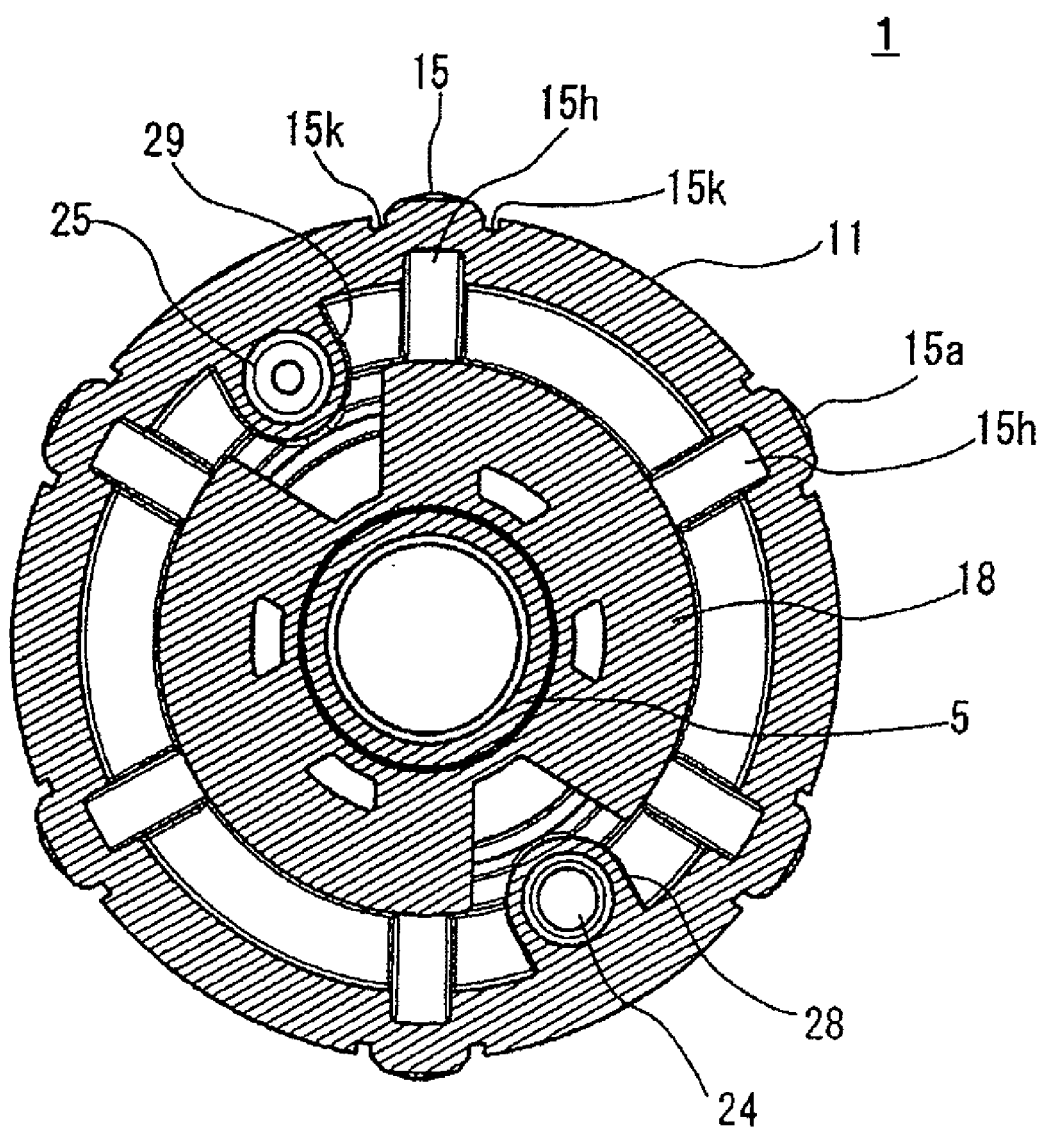
FIG. 5 is a cross section view of the grommet taken along lines V-V in FIG. 4.

As shown in FIG. 5, each projecting rib 15 is provided in its inner peripheral surface with a recess 11h that extends along a whole length in a longitudinal direction to facilitate deformation of the projecting rib 15.

As shown in FIG. 4, the annular coupling section 6 that interconnects the outer tube 8 and inner tube 5 protrudes in a V-shaped configuration from an inner peripheral end 6b contiguous with the outer peripheral surface 5a of the inner tube 5 to the pushing-in side P1. An outer peripheral end 6a of the annular coupling section 6 is disposed at the pushing-in side P1 over the inner peripheral end 6b and is contiguous with the larger thickness portion 9 of the outer tube 8.

Figure 9A:
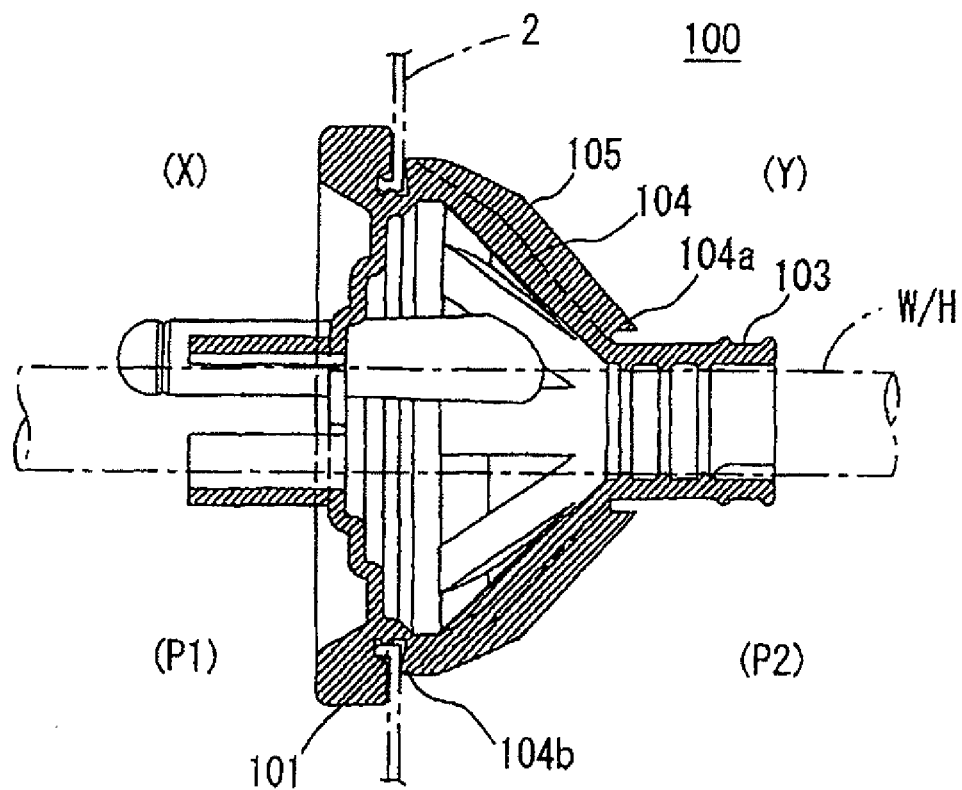
FIG. 9A is a longitudinal section view of a prior art grommet.
Figure 9B:
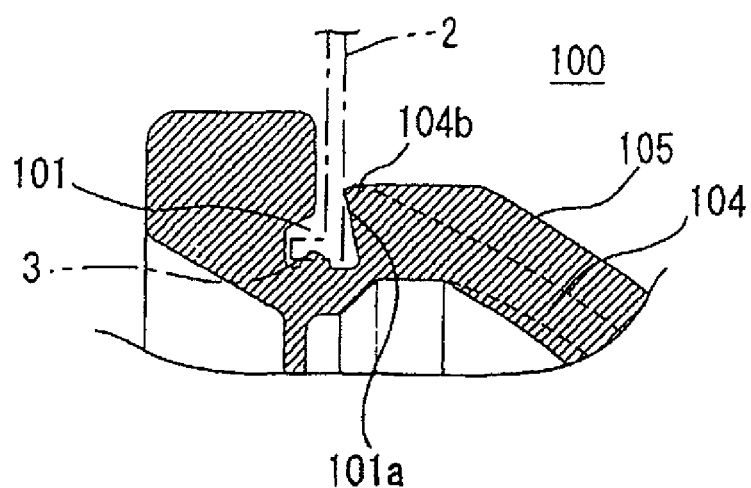
FIG. 9B is an enlarged longitudinal section view of a part of the prior art grommet shown in FIG. 9A.

That is, although the smaller diameter side of the enlarging diameter tubular section is contiguous with the smaller diameter tubular section in the prior art one-motion type grommet 100 shown in FIGS. 9A and 9B, the larger diameter side of the outer tube 8 (corresponding to the enlarging diameter tubular section) is coupled through the annular coupling section 6 to the inner tube 5 in the grommet 1 of the present invention.

A thickness t3 (FIG. 3) of the annular coupling section 6 is set to be substantially equal to or less than a thickness t4 (FIG. 4) of the inner tube 5 so as to be deflectable. An angle θ (theta) of the annular coupling section 6 that is slant coupled to the outer peripheral surface 5a of the inner tube 5 is set to be 20 to 30 (twenty to thirty) degrees. Thus, the inner tube 5 and outer tube 8 are not interconnected to each other directly in the radial direction but interconnected to each other through the V-shaped annular coupling section 6. Thus, when the inner tube 5 is deformed in connection with bending of the wire harness W/H, the annular coupling section 6 absorbs the deformation of the inner tube 5, so that the deformation of the inner tube 5 is not transmitted directly to the outer tube 8. This serves as a release portion.

As shown in FIG. 4, the annular coupling section 6 is provided on its inclined portion between an inner peripheral end 6b and a V-shaped projecting end 6c with a bent portion 6d that is bent toward the slant wall section 11. A pushing rib 18 having a larger thickness protrudes from the bent portion 6d toward the slant wall section 11. As shown in FIG. 5, the pushing rib 18 is continuous in its peripheral direction but it is divided at positions corresponding to guide inner tubes 28 and 29 for permitting an opener cable and a feed water hose to pass.

A thickness t5 (FIG. 4) of the pushing rib 18 is large enough to be 2 to 4 (two to four) times of the thickness t3 of the annular coupling section 6, is larger than the thickness t1 of the slant wall section 11, and is substantially the same as the thickness of the larger thickness portion 9.

The reason why the pushing rib 18 is a larger thickness is ascribable to the fact that, when the grommet 1 is inserted into the through-hole 3 in the vehicle body panel 2, a projecting end 18a of the pushing rib 18 contacts with the inner peripheral surface of the slant wall section 11 to permit the pushing force to be transmitted to the outer tube 8. When the grommet 1 is attached to the vehicle body panel 2, the projecting end 18a of the pushing rib 18 is disposed near the slant wall section 11 so that they can contact with each other. Thus, a sound-insulating space B (FIG. 4) is defined among the pushing rib 18, the inner tube 5, the annular coupling section 6, and the outer tube 8.

As shown in FIG. 4, the pushing rib 18 protrudes slightly slant in its outer diametrical direction. The projecting end 18a is opposed to the smaller diameter end of the slant wall section 11 contiguous with the drawing-out distal end side tubular portion 12. The drawing-out distal end side tubular portion 12 is provided with a stopper projection 12a, which protrudes inward from the slant wall section 11, at a side of the slant wall section 11 with which the pushing rib 18 contacts. Since the stopper projection 12a is provided on the drawing-out distal end side tubular portion 12, it is possible to prevent the projecting end 18a of the pushing rib 18 from slipping down into the drawing-out distal end side tubular portion 12 and to surely bring the pushing rib 18 into contact with the slant wall section 11 so as to transmit the pushing force to the slant wall section 11.

Furthermore, as shown in FIG. 6, the slant wall section 11 is provided with an annular shallow recess in an inner surface from an outer diameter side, with which the projecting end 18a of the pushing rib 18 contacts, to the curved portion 11c. Thus, the slant wall section 11 is provided with a smaller thickness portion 19 having a smaller thickness t6. Since the slant wall section 11 is provided with the smaller thickness portion 19 from the curved portion 11c to the smaller diameter side, the smaller thickness portion 19 serves as a stress absorbing portion when the drawing-out distal end side tubular portion 12 is deformed on account of the bending of the wire harness. That is, a bending stress is concentrated in the smaller thickness portion 19, so that the drawing-out distal end side tubular portion 12 is hard to transmit its deformation to the vehicle body latch recess 10. The thickness t6 of the smaller thickness portion 19 is smaller than the thickness t3 of the annular coupling section 6.

Two wire members such as the opener cable for releasing a bonnet and the feed water hose for washing penetrate the grommet 1. As shown in FIG. 2, the slant wall section 11 is provided with through-apertures 24 and 25 so that outer guide pipes 26 and 27 for the opener cable and feed water hose protrude from the through-apertures 24 and 25. The outer guide pipes 26 and 27 are provided on their distal ends with closing end portions 26a and 27a. When using the outer guide pipes 26 and 27, the closing end portions 26a and 27a are cut away to open the outer guide pipes 26 and 27.

The smaller diameter inner tube 5, through which the wire harness W/H passes in a close contact manner, protrudes from the opposite ends of the outer tube 8 in the longitudinal direction. The inner tube 5 is provided on an inner peripheral surface of each protruding end portion over the outer tube 8 with three waterproofing lips 33 (FIG. 4).

As shown in FIG. 6, since the through-hole 3 in the vehicle body panel 2 for receiving the grommet 1 is an aperture with a burr 3b that protrudes from the peripheral edge 3a around the through-hole 3 to the pushing-in side P1, the vehicle body latch recess 10 in the outer tube 8 has a configuration corresponding to the burr 3b.

A process for attaching the wire harness W/H to the grommet 1 is carried out by inserting the electrical wires in the wire harness W/H while enlarging the inner peripheral surface of the inner tube 5 by a jig (not shown). After inserting the wire harness W/H into the inner tube 5, the wire harness W/H drawn out from the opposite ends 5P1 and 5P2 of the inner tube 5 and the opposite ends 5P1 and 5P2 are secured to one another by winding adhesive tapes 40 around them.

Varying sizes in diameter of the wire harness W/H are absorbed in the annular coupling section 6, so that the outer tube 8 connected through the annular coupling section 6 to the inner tube 5 is not subject to affections caused by the varying sizes. Accordingly, it is possible to maintain the outer diameter of the outer tube 8 in a designed size. That is, since the annular coupling section 6 has a smaller thickness enough to be deformed and is formed into the V-shape, the annular coupling section 6 can respond to the varying sizes in diameter merely by changing the bending angle.

As shown in FIG. 6, the grommet 1 mounted on the wire harness W/H is inserted into and attached to the through-hole 3 with the burr 3b in the vehicle body panel 2 that partitions a vehicle body into the engine room X and the passenger room Y.

A working of inserting the grommet 1 into the through-hole 3 is carried out by inserting the drawing-out end 5P2 of the inner tube 5 into the through-hole 3 from the engine room X, and then pushing the grommet 1 into the through-hole 3 by a working person in the engine room X while holding the wire harness W/H with the grommet 1 by the working person. The grommet 1 is latched in the through-hole 3 by a one-motion operation in which a pushing-in action is effected at one time from the one side.

Specifically, since the portion 11d of the smaller diameter side of the slant wall section 11 of the outer tube 8 is smaller than the inner diameter of the through-hole 3, the grommet 1 can be readily inserted into the through-hole 3. When the curved portion 11c of the slant wall section 11 reaches the inner peripheral surface 3a of the through-hole 3, the stepped projecting ribs 15 of the slant wall section 11 contact with the inner peripheral surface 3a, thereby causing an inserting resistance. Then, the outer tube 8 cannot be further pushed into the through-hole 3 easily from the inner peripheral surface 3a.

However, if the working person holds and pushes the wire harness W/H to be drawn out from the pushing-in side P1 of the inner tube 5, the inner tube 5 that closely contacts with the wire harness W/H is advanced to the drawing-out side P2 in the drawing-out direction. The pushing rib 18 of the annular coupling section 6 connected to the inner tube 5 is also advanced to the inner surface of the slant wall section 11 of the outer tube 8 by the movement of the inner tube 5 and the projecting end 18a of the pushing rib 18 bumps onto the inner peripheral surface of the slant wall section 11. Thus, since the slant wall section 11 is pushed and moved forward by the pushing rib 18, the outer tube 8 with the slant wall section 11 passes through the through-hole 3 to the passenger room Y.

When the pushing rib 18 pushes the slant wall section 11, since the projecting ribs 15 are provided on the outer peripheral surface of the slant wall 11 and the top surfaces 15a of the projecting ribs merely contact with the inner peripheral surface 3a of the through-hole 3 and the inner peripheral surface of the burr 3b, a contact area between the slant wall section 11 and the through-hole 3 is reduced, thereby lowering an inserting force. Further, since the recesses 15h are provided in the inner peripheral surfaces of the projecting ribs 15 so that stiffness of the projecting ribs are lowered to be deflectable inward, it is possible to reduce the inserting force and to avoid an excessive inserting force in the curved portion 11c.

When the pushing rib 18 presses the slant wall section 11 and the larger diameter ends of the stepped projecting ribs 15 reach the inner peripheral surface 3a of the through-hole 3, the first, second, and third slant surfaces 15c, 15f, and 15g of the three-cut-away portion contact with the inner peripheral surface 3a. At this time, even if the vehicle body latch recess 10 is not coaxial with the inner peripheral surface 3a of the through-hole 3 and the inner peripheral surface of the burr 3b and is inclined with respect to the peripheral surfaces, the second and third slant surfaces 15f and 15g provided on the side surfaces 15d and 15e of each projecting rib 15 are not caught by the distal end of the burr 3b and are slid on the burr 3b, so that the recess 10 receives the burr 3b. Thus, the inner peripheral surface 3a of the through-hole 3 and the inner peripheral surface of the burr 3b are slid on the three-cut-away portion of each projecting rib 15 and are fallen into the vehicle body latch recess 10, thereby securing the grommet 1 to the vehicle body panel 2.

Figure 7A:
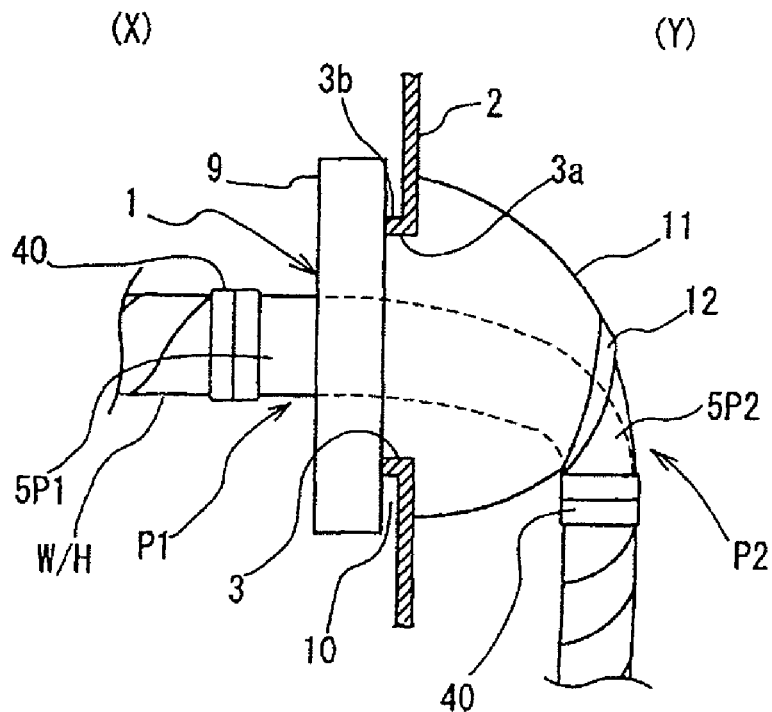
FIG. 7A is a schematic side elevation view of the grommet in the case where the wire harness is bent at the drawing-out side of the grommet.

As described above, after the grommet 1 is secured to the vehicle body panel 2, as shown in FIG. 7A, the wire harness W/H drawn out into the passenger room Y is sharply bent downward (or upward, rightward, or leftward) by an angle of 90 (ninety) degrees in many cases.

If the wire harness W/H is bent downward by the angle of 90 degrees, the inner tube 5 through which the wire harness W/H passes in the close contact manner through the inner and that is secured to the wire harness W/H by the adhesive tapes 40 follows the bending angle of the wire harness W/H, and the inner tube 5 is bent downward at the drawing-out end 5P2.

In the grommet 1 of the present invention, even if the drawing-out end 5P2 of the inner tube 5 is bent downward, the outer tube 8 is not coupled to the inner tube 5 at the drawing-out end 5P2 and the great clearance S exists between the drawing-out distal end side tubular portion 12 of the outer tube 8 and the inner tube 5. Thus, since the inner tube 5 is merely bent in the clearance S between the inner tube 5 and the outer tube 8, the outer tube 8 is not bent at the drawing-out side P2.

In the case where the wire harness W/H is bent sharply by the angle of 90 degrees or so, the inner tube 5 is greatly bent by the bending of the wire harness W/H, the bending will be transmitted through the annular coupling section 6 connected to the inner tube 5 to the outer tube 8. Even in this case, the V-shaped thin annular coupling section 6 will absorb the deformation of the inner tube 5.

Further, any recess is not formed in the inner peripheral surface of the slant wall section 11 contiguous with the inner peripheral surface of the vehicle body latch recess 10 and the inner peripheral surface of the slant wall section 11 defines the parallel surface 11h in parallel to the axial direction, thereby enhancing a support force. Thus, it is possible to prevent the vehicle body latch recess 10 from floating up and to obtain a good sealing function.

Figure 7B:
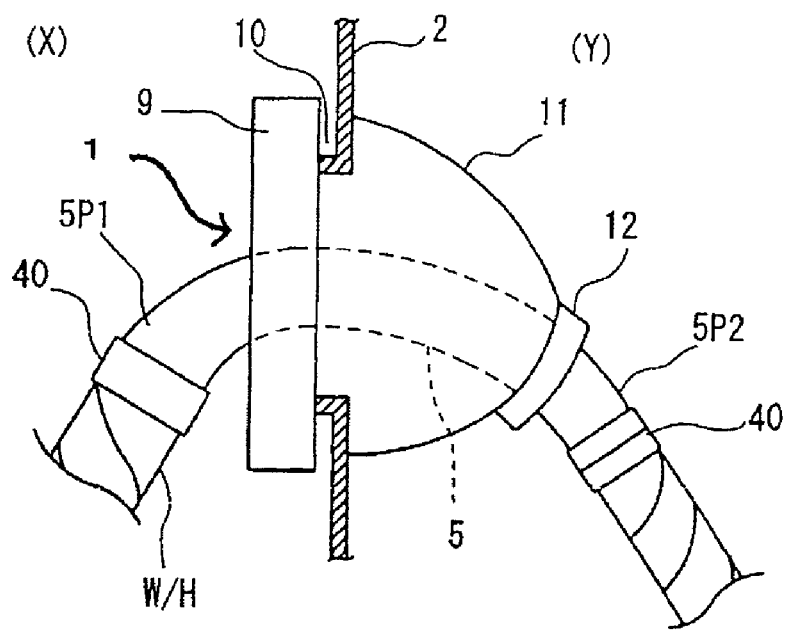
FIG. 7B is a schematic side elevation view of the grommet in the case where the wire harness is bent at the pushing-in side of the grommet.

On the other hand, even if the wire harness W/H is bent at the pushing-in side P1 in the engine room X, as shown in FIG. 7B, it is possible for the annular coupling section 6 to absorb the bending of the wire harness W/H, thereby surely holding the vehicle body latch recess 10 in the through-hole 3. Thus, it is possible to prevent the vehicle body latch recess 10 from floating up on account of the bending affection and to prevent the sealing function from being lowered.

Figure 8:
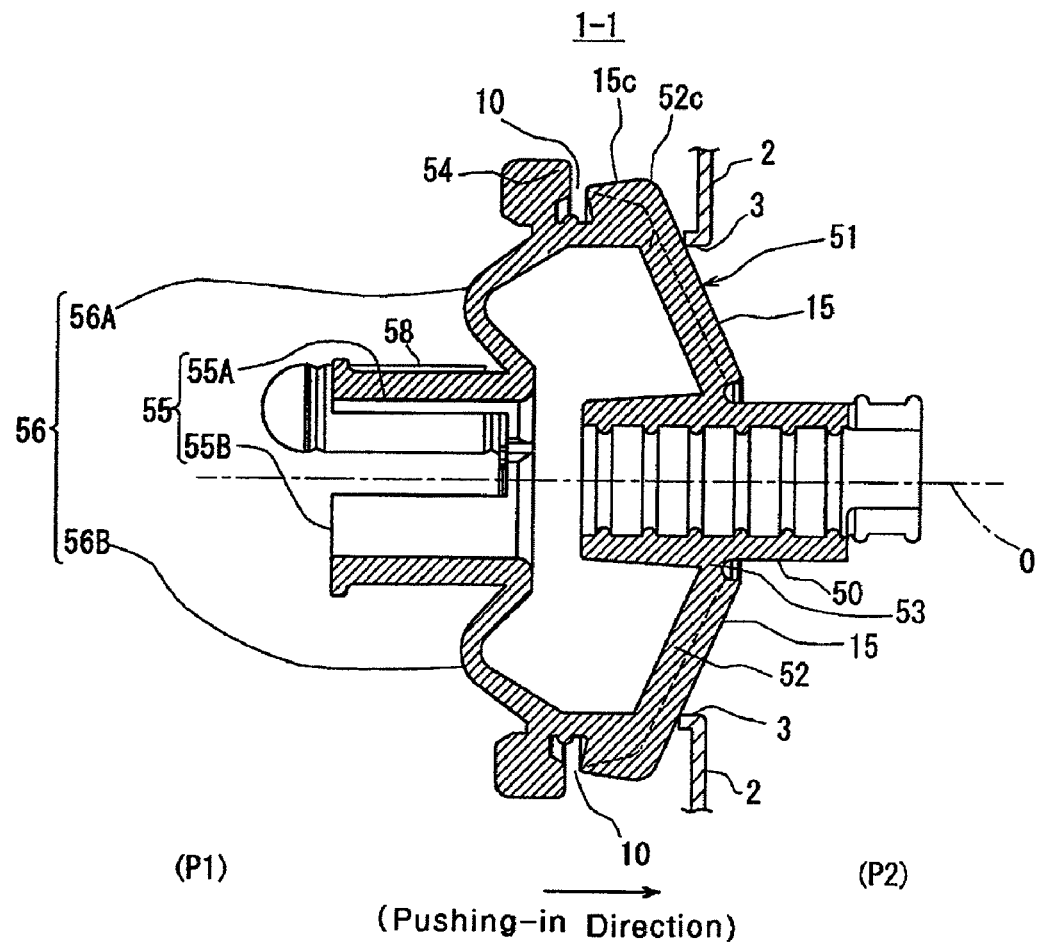
FIG. 8 is a longitudinal section view of a second embodiment of the grommet in accordance with the present invention.

FIG. 8 shows a second embodiment of a grommet 1-1 in accordance with the present invention.

The grommet 1-1 is a coupled type grommet in which a smaller diameter end of a slant wall section 52 at a drawing-out side P2 is coupled to an inner tube 50, as is the case with the prior art grommet 100 shown in FIG. 9A.

The grommet 1-1 includes a smaller diameter tube 50 corresponding to the inner tube 5 in the first embodiment, and an enlarging diameter tubular section 51 corresponding to the outer tube 8 in the first embodiment. The enlarging diameter tubular section 51 has a slant wall section 52 of which a smaller diameter end is connected to the smaller diameter tube 50 through an annular coupling portion 53.

The slant wall section 52 is provided with a curved portion 52c and stepped projecting ribs 15 that extend from a smaller diameter end to a larger diameter end of the section 52 and that are disposed radially on the section 52, as is the case with the first embodiment.

Each projecting rib 15 is provided on a larger diameter side with a first slant surface 15c, a second slant surface (not shown), and a third slant surface (not shown) that define three-cut-away portion, as is the case with the first embodiment.

The slant wall section 52 is provided on a larger diameter end with a larger thickness portion 54. An annular vehicle body latch recess 10 is provided in a boundary area between the larger thickness portion 54 and the slant wall section 52.

A smaller thickness closing surface portion 56 (56A, 56B) protrudes from an inner peripheral surface of an enlarging diameter section 51 opposed to a bottom surface of the vehicle body latch recess 10. A central part of the closing surface portion 56 is divided in a diametrical direction to form a wire harness passing portion. The closing surface portion 56 has a smaller thickness and a V-shaped configuration that protrudes toward the pushing-in side P1.

A half cylindrical tubular section 55 (55A, 55B) protrudes from the closing surface portion 56 to be closely contacted with the wire harness by winding a tape around the section 55. A guide pipe 58 for a feed water hose and a guide pipe for an opener cable (not shown) protrude from the closing surface portion 56.

Since each projecting rib 15 is provided on a distal end with a three-cut-away portion in the above grommet 1-1, it is possible to prevent the projecting rib 15 from being caught by the peripheral edge around the through-hole, thereby smoothly carrying out an inserting work of the grommet.

Even if the wire harness is bent and then the half cylindrical tubular section 55 is bent, since the section 55 is coupled through the annular coupling section 56 to the slant wall section 52, the closing surface portion 56 can absorb the bending of the wire harness and the vehicle body latch recess 10 does not follow the bending, thereby preventing the recess 10 from floating up.

The invention claimed is:

1. A grommet configured for mounting on a wire harness to be inserted into a through-hole in a vehicle body, and engaged with a vehicle body, said grommet being made of an elastic material and comprising:
    an inner tube for passing electrical cables in said wire harness in a close contact manner; and
    an outer tube coupled through an annular coupling section to an outer peripheral surface of said inner tube and provided with a slant wall section;
    wherein said outer tube is provided on a larger diameter end of said slant wall section with a larger thickness portion in parallel to an axial direction, an annular vehicle body latch recess is provided in an outer peripheral surface at a boundary area between said larger diameter end of said slant wall section and said larger thickness portion, and said slant wall section is provided on an outer peripheral surface with a plurality of stepped projecting ribs that extend radially from a smaller diameter end of said slant wall section to said larger diameter end and are separated apart from one another in a peripheral direction; and
    a distal end of each of said projecting ribs is disposed at a side surface end of said vehicle body latch recess, each of said projecting ribs is provided on a stepped top surface with a first slant surface that is inclined down to said side surface end of said vehicle body latch recess, and is provided on respective side surfaces with a second slant surface and a third slant surface that are inclined down from said top surface across said first slant surface, and said first, second, and third slant surfaces form a three-side-cut-away portion.

2. A grommet according to claim 1, wherein said slant wall section and said projecting ribs of said outer tube are provided with curved portions at an outer diametrical position having an outer diameter corresponding to an inner diameter of said through-hole in said vehicle body panel, said curved portions have different inclination angles on said slant wall section, inclination angles of an outer peripheral surface of said slant wall section at a larger diameter side with respect to said curved portions are set to be smaller than inclination angles at a smaller diameter side with respect to said curved portions, and said first, second, and third slant surfaces are provided on said larger diameter side from said curved portions to said vehicle body latch recess; and wherein ridges intersecting among said first, second, and third slant surfaces and ridges between said top surface and said second and third slant surfaces are rounded.

3. A grommet according to claim 2, wherein inclination angles of said first, second, and third slant surfaces with respect to said top surface are 30 to 60 (thirty to sixty) degrees, and the number of said projecting ribs is 4 to 8 (four to eight).

4. A grommet according to claim 3, wherein said annular coupling section protrudes from an outer peripheral surface of said inner tube at an intermediate part between both ends of said inner tube at a pushing-in side and a drawing-out side in a longitudinal direction, said larger thickness portion of said outer tube is contiguous with an outer peripheral end of said annular coupling section, an inner peripheral surface at said smaller diameter end of said slant wall section is spaced apart from said outer peripheral surface of said inner tube, and an end of said inner tube at said drawing-out side protrudes outward from said slant wall section.

5. A grommet according to claim 4, wherein said annular coupling section protrudes slantingly from a coupling part with said inner tube toward said pushing-in side, a pushing rib protrudes from a slant portion of said annular coupling section toward an inner surface of said slant wall section of said outer tube, and a bending stress absorbing portion is disposed at a side of a curved portion over a position on said slant wall section with which said pushing rib contacts.

6. A grommet according to any one of claim 3, wherein said smaller diameter end of said slant wall section is coupled through said annular coupling section to said inner tube.

7. A grommet according to claim 2, wherein said annular coupling section protrudes from an outer peripheral surface of said inner tube at an intermediate part between both ends of said inner tube at a pushing-in side and a drawing-out side in a longitudinal direction, said larger thickness portion of said outer tube is contiguous with an outer peripheral end of said annular coupling section, an inner peripheral surface at said smaller diameter end of said slant wall section is spaced apart from said outer peripheral surface of said inner tube, and an end of said inner tube at said drawing-out side protrudes outward from said slant wall section.

8. A grommet according to claim 7, wherein said annular coupling section protrudes slantingly from a coupling part with said inner tube toward said pushing-in side, a pushing rib protrudes from a slant portion of said annular coupling section toward an inner surface of said slant wall section of said outer tube, and a bending stress absorbing portion is disposed at a side of a curved portion over a position on said slant wall section with which said pushing rib contacts.

9. A grommet according to any one of claim 2, wherein said smaller diameter end of said slant wall section is coupled through said annular coupling section to said inner tube.

10. A grommet according to claim 1, wherein inclination angles of said first, second, and third slant surfaces with respect to said top surface are 30 to 60 (thirty to sixty) degrees, and the number of said projecting ribs is 4 to 8 (four to eight).

11. A grommet according to claim 10, wherein said annular coupling section protrudes from an outer peripheral surface of said inner tube at an intermediate part between both ends of said inner tube at a pushing-in side and a drawing-out side in a longitudinal direction, said larger thickness portion of said outer tube is contiguous with an outer peripheral end of said annular coupling section, an inner peripheral surface at said smaller diameter end of said slant wall section is spaced apart from said outer peripheral surface of said inner tube, and an end of said inner tube at said drawing-out side protrudes outward from said slant wall section.

12. A grommet according to claim 11, wherein said annular coupling section protrudes slantingly from a coupling part with said inner tube toward said pushing-in side, a pushing rib protrudes from a slant portion of said annular coupling section toward an inner surface of said slant wall section of said outer tube, and a bending stress absorbing portion is disposed at a side of a curved portion over a position on said slant wall section with which said pushing rib contacts.

13. A grommet according to any one of claim 10, wherein said smaller diameter end of said slant wall section is coupled through said annular coupling section to said inner tube.

14. A grommet according to claim 1, wherein said annular coupling section protrudes from an outer peripheral surface of said inner tube at an intermediate part between both ends of said inner tube at a pushing-in side and a drawing-out side in a longitudinal direction, said larger thickness portion of said outer tube is contiguous with an outer peripheral end of said annular coupling section, an inner peripheral surface at said smaller diameter end of said slant wall section is spaced apart from said outer peripheral surface of said inner tube, and an end of said inner tube at said drawing-out side protrudes outward from said slant wall section.

15. A grommet according to claim 14, wherein said annular coupling section protrudes slantingly from a coupling part with said inner tube toward said pushing-in side, a pushing rib protrudes from a slant portion of said annular coupling section toward an inner surface of said slant wall section of said outer tube, and a bending stress absorbing portion is disposed at a side of a curved portion over a position on said slant wall section with which said pushing rib contacts.

16. A grommet according to any one of claim 1, wherein said smaller diameter end of said slant wall section is coupled through said annular coupling section to said inner tube.

* * * * *